US00RE35231E

United States Patent [19]

Wilson

[11] E Patent Number: Re. 35,231

[45] Reissued Date of Patent: May 7, 1996

[54] INTERACTIVE CONNECTOR UNIT FOR A WIRING HARNESS

[75] Inventor: Wayne G. Wilson, Flint, Tex.

[73] Assignee: Automotive Digital Systems, Inc., Tyler, Tex.

[21] Appl. No.: 83,399

[22] Filed: Jun. 25, 1993

Related U.S. Patent Documents

Reissue of:

[64] Patent No.: 5,026,293
Issued: Jun. 25, 1991
Appl. No.: 452,819
Filed: Dec. 19, 1989

[51] Int. Cl.[6] ..... H01R 13/66; F02P 5/00

[52] U.S. Cl. ..... 439/76.1; 123/417

[58] Field of Search ..... 439/76, 65, 68, 439/69, 74, 189, 620, 628, 632; 123/416, 417

[56] References Cited

U.S. PATENT DOCUMENTS 4,250,858 2/1981 Jeenicke et al. ..... 123/417 X
4,726,790 2/1988 Hadjis ..... 439/620
4,894,630 1/1990 Ueta et al. ..... 439/620 X

*Primary Examiner*—Steven C. Bishop
*Attorney, Agent, or Firm*—William D. Jackson; Harris, Tucker & Hardin

[57] ABSTRACT

A modular interactive connector unit is provided which has a base block with an array of male pins on one side and opposed female pins on the other side for interconnection between an electronic control assembly for an automotive engine and a wiring harness otherwise intended for direct connection to the electronic control assembly. The base block contains an array of contact points and adapter points which correspond with the control circuits in the electronic control assembly. Circuit completing electrical adapters from the adapter arrays on the base member support a board element having spaced apart arrays of adapter points for insertion of a circuit altering device in selected control circuits. A cap protects the board elements. The circuit altering devices alter the voltages read by the electronic control assembly to enhance performance of an engine. The modular unit may be removed and the wiring harness connected directly to the electronic control assembly to return the control circuits to their factory settings.

53 Claims, 5 Drawing Sheets

INTERACTIVE CONNECTOR UNIT FOR A WIRING HARNESS

Matter enclosed in heavy brackets [ ] appears in the original patent but forms no part of this reissue specification; matter printed in italics indicates the additions made by reissue.

I. FIELD OF THE INVENTION

The invention relates to the field of wiring harness connectors, more particularly to a modular unit insertable in a wiring harness for automotive electronic control.

II. BACKGROUND OF THE INVENTION

Modern automotive vehicles, mass produced for the consumer market, have been the recipient of a surge in application of computer arts to the control systems. Most of the activity which began in the 1970's and has accelerated in the 1980's, has involved the application of small digital or analog computers to monitor and control the operating parameters of the automotive engine and its components. Most of the applications involve the connections of a computer "box" to a wiring harness which collects wires leading to and from sensing elements and control elements. A multiplicity of such wires are collected at a wiring harness which has a set of male connector pins which are removably plugged into a female connector plug on an electronic control assembly. Alternately the wiring harness may have the female connecting plug and the electronic control assembly a plurality of male connecting pins insertable therein. In this way, each wire leading from a sensor or control element becomes a circuit which is easily connected and disconnected to the proper lead of the electronic control assembly computer. The circuits completed through the wiring harness and electronic control assembly and the voltages and resistances of the various control and sensing elements are pre-selected at the factory to produce average performance of the engine.

In order to produce enhanced performance of the engine it has been found desirable to add certain circuit altering devices in some of the sensing and control circuits, but there has been no easy inexpensive way to accomplish this. One possible way would be to replace the electronic control assembly with one containing different values for certain circuit elements or operating at different voltages, but this is expensive and impractical. Another solution would be to break an individual wire leading to the wiring harness to add certain resistors, capacitors, transistors, and/or diodes, or to replace the sensing or control elements with ones having different values for operation. This approach would be equally expensive and difficult and could not be done quickly and easily. Moreover, such changes would be permanent and not easily reversed if it was desired to put the control system back to its factory settings.

The present invention provides an inexpensive, compact interactive interconnecting unit insertable between the wiring harness and the electronic control assembly to instantly and simultaneously enhance the performance characteristics of the engine by adding circuit altering devices. The modular unit can be quickly and easily removed to return the control functions to their original factory settings.

SUMMARY OF THE INVENTION

The invention is an interactive connector unit insertable between a wiring harness and an automotive electronic control assembly of the type which receives input from sensors of operating parameters and produces control signals in response thereto. It has a first board means for electrically interconnecting a first set of contact points and a first set of adapter points and a second board means for electrically interconnecting a second set of contact points with a second set of adapter points, each of the individual contact points of a contact point set being connected to the individual adapter points of an adapter point set. There is a third board means for electrically interconnecting spaced apart third and fourth sets of adapter points which correspond to the first and second set of adapter points on the first and second boards. The third board means includes means for inserting circuit altering devices between selected ones of said third and fourth sets of adapter points. Electrical adapters complete the circuit between individual ones of the adapter points on the first and second board means with individual ones of the adapter points on the third and fourth sets to complete the circuit between the first set of adapters on the first board means through the third and fourth sets of adapters on the third board means to the second set of adapters on the second board means.

The board means are insulating boards having conductor traces joining individual ones of said contact and adapter points and between individual ones of said third and fourth sets of adapter points, the sets of adapter points and contact points having conductive openings for each point. The first and second board means are rectangular insulating boards mounted together in insulated contact to form a base block wherein the outside opposed surfaces of the base block contain generally opposed ones of the conductive openings of the contact points of the first and second board means. The first and second adapter openings are arranged on opposite surfaces of the base block running along one edge of the base block. The circuit completing electrical adapters are stiff wires which support the third board means relative to the first and second board means in close proximity thereto, making a T-shaped configuration. The flat surfaces of the third board means are held generally perpendicular to the flat surfaces of the first and second board means comprising the base block. The circuit completing electrical adapters are generally L-shaped conductors with right-angled arms which may be supported in proper spaced relationship by a separate plastic mounting element.

One of the sets of contact openings on the outer surface of the base block has mounted thereto male individual circuit connecting pins for connecting to a corresponding set of female connecting pins in a wiring harness or an electronic control assembly. The opposed other set of openings in the opposite surface of the base block has oppositely facing female individual circuit connecting pins for receiving a corresponding male set of individual connecting pins from a wiring harness or electronic control assembly, whichever has the male circuit connecting pins. The male circuit connecting pins on the base block are surrounded by a protective shell and the opposite female circuit connecting pins are mounted in a pin receiving and holding block.

The wiring harness or an extension of a portion of the electronic control assembly having male connecting pins, is placed over the pin receiving block on one side of the base block with the individual pins in electrical contact. The other of the wiring harness or extension of the electronic control assembly having female connecting pins is placed within the shell on the side of the base block having male connecting pins, with the individual pins in electrical contact with individual circuits leading from the wires of the wiring harness to one of the board means through the third board means to the other of the board means and through the other connector pins, completing the circuit for which it was intended in the electronic control assembly.

One or more circuit altering devices are mounted between individual ones of the third and fourth adapter sets of adapter point openings for easily and economically altering the electrical characteristics of the circuit thereby affected. Where the circuit altering devices, such as resistors, transistors, diodes or capacitors, are inserted between individual adapter points, the trace between said points is then broken so that the device can have its circuit altering effect. Some of the circuits can be altered in this manner while leaving the other circuits intact. By appropriate selection and placement of circuit altering devices, individual circuits are adjusted for maximum performance as desired. The effect of a particular circuit altering device can be nullified by reestablishing the broken trace between one of the array of third and fourth adapter points. The third board element is normally enclosed in a cap member to protect it and provide a surface for positioning useful information. If it is desired to return the automotive control system to the factory settings, it is a simple matter to disconnect the wiring harness from the modular interactive connector unit and from the electronic control assembly, remove the insert, and reestablish contact between the wiring harness and the electronic control assembly without the connector unit.

A modification of the present invention simplifies the construction of the board elements even though the same sixty point array on the boards is utilized. The first and second board means are constructed alike in that each has a sixty point array of contact points and a sixty point array of adapter points on each board. In the modification, half, or a selected number of contact point locations on the board, have traces leading to the set of adapter points on the board. As exemplified in FIGS. 9 through 12, only half of the contact points are connected by electrically conductive traces to the array of adapter points. The array of adapter points need only have the same number of adapter point openings as there are traces leading to contact points for which it is desired to be able to alter the electrical characteristics of a circuit.

If the adapter points are sixty in number in two rows of thirty, they may be joined by short traces between each row of thirty as indicated in FIG. 9. Likewise, if the third board element, which has spaced apart sets (arrays) which may comprise multiple rows of thirty in each array, the individual adapter points in each row may be connected to the adjacent adapter point in the next row or rows as indicated in FIG. 10 without connection between the two spaced apart sets. Alternately, spaced apart single rows of thirty adapter point openings could be utilized since only half the contact points will be connectable through traces on the third board element.

The contact points that are connected by traces to the adapter points on each of the first and second board elements will be referred to as contact points and the contact points which are not connected by traces to the adapter points may be referred to as contact openings. The contact points together with the contact openings comprise a contact point array, which in the illustrated case still has sixty locations.

When the first and second board elements are mounted together with an insulating board therebetween to form a base block, a special means for connection is necessary to complete the circuits through the contact openings in the sixty pin array as opposed to the contact points which have the electrical traces. This is because the wiring harness and electronic control assembly each have sixty pin locations (male or female) which need to be accommodated.

The special means for connection is a modified pin which passes through the contact openings in the base block from one board means through the insulating board and out the opposed board means to create a straight through electrical connection when the inline adapter is installed between the wiring harness and the electronic control assembly. When so positioned, the modified pin is constructed so that a female connector pin will extend from one surface of one board means of the base block and a male pin connector portion will extend from the opposite surface of the opposed board means, for connection to the female connecting side of the assembly. The contact points in each of the opposed board means, as opposed to the contact openings, will still have the same male or female connecting pins in electrical contact therewith arranged so that one side of the base block comprising a surface of a first or second board means will have sixty female connector pins and the opposite side of the base block will have an array of sixty male pins. These will be a combination of the standard male and female pins and the modified pins.

Naturally the modified pins must be longer than the other pins but in assembly will be alike so that they will fit the wiring harness and/or control assembly. Thus the modified pins provide a straight through direct connection and consequently those circuits containing modified pins are not alterable in the manner previously described. However, the other half of the contact points are still connected to the adapter points on the first and second board means and through the stiff wire adapters are connected to the third board means wherein one or more circuit altering devices (or direct connections) can be connected between the spaced apart arrays of adapter points on the third board element to alter the circuits as desired. Likewise, future alterations are similarly easy to make by removing a previous circuit altering device and installing another. The remainder of the components may be the same as before described.

Note that the inline adapter can be removed and the wiring harness and electronic control assembly be connected directly together just as before, to return the circuits to their original condition. The modified pins may be held in position by solder or adhesive or any other suitable means. The modification makes it easier to layout the traces between contact points and adapter points with less danger of short circuiting. It thus becomes more certain of performance and less costly. Rejects are reduced. The desired effect of the invention is still achieved because rarely would it be desirable or necessary to modify more than ten or twelve individual circuits and the provision of thirty alterable circuits provides room for expansion or further development. The circuits with the modified pins are not alterable and remain as they were. There is nothing magic about selecting half the circuits too be modified and leaving the other half unmodifiable. The number of circuits that are selected to be modifiable can vary greatly depending upon the number of contact points for which traces are provided and the number of modified pins used in the contact openings where there are no traces.

The interactive connector unit can be utilized as an inline adapter for conveniently altering the electrical characteristics of selected ones of a plurality of circuits each defined by one of a bundle of wires having a disconnectable pin and socket wiring harness. Where there is a bundle of wires comprising individual wired circuits, a wiring harness can be installed of the type having male and female connector pins which are releaseably engaged to complete the circuits of the individual wires. In such case there will be two bundles of wires which can be connected to the opposite sets of male or female connecting pins on the base block in a compact assembly that is easily modified. It becomes extremely convenient to modify any of the individual circuits by the addition of circuit altering devices placed in the opposed spaced apart arrays of electrical conductive sockets on the third board element heretofore identified as adapter points. By breaking the individual traces between particular points and installing circuit altering devices, an alteration of an individual wired circuit is easily and inexpensively attained. It is also far more convenient to modify the change in the circuit by removing circuit altering devices previously installed or by reestablishing the traces to negate a previously installed device without the need of finding, stripping and adding a circuit altering device to an individual wire element of a circuit. It is equally easy to remove the inline adapter to return the circuits in the bundle of wires to their original condition by simply reconnecting the opposed wiring harnesses after the inline adapter is removed.

DETAILED DESCRIPTION

Figure 1:
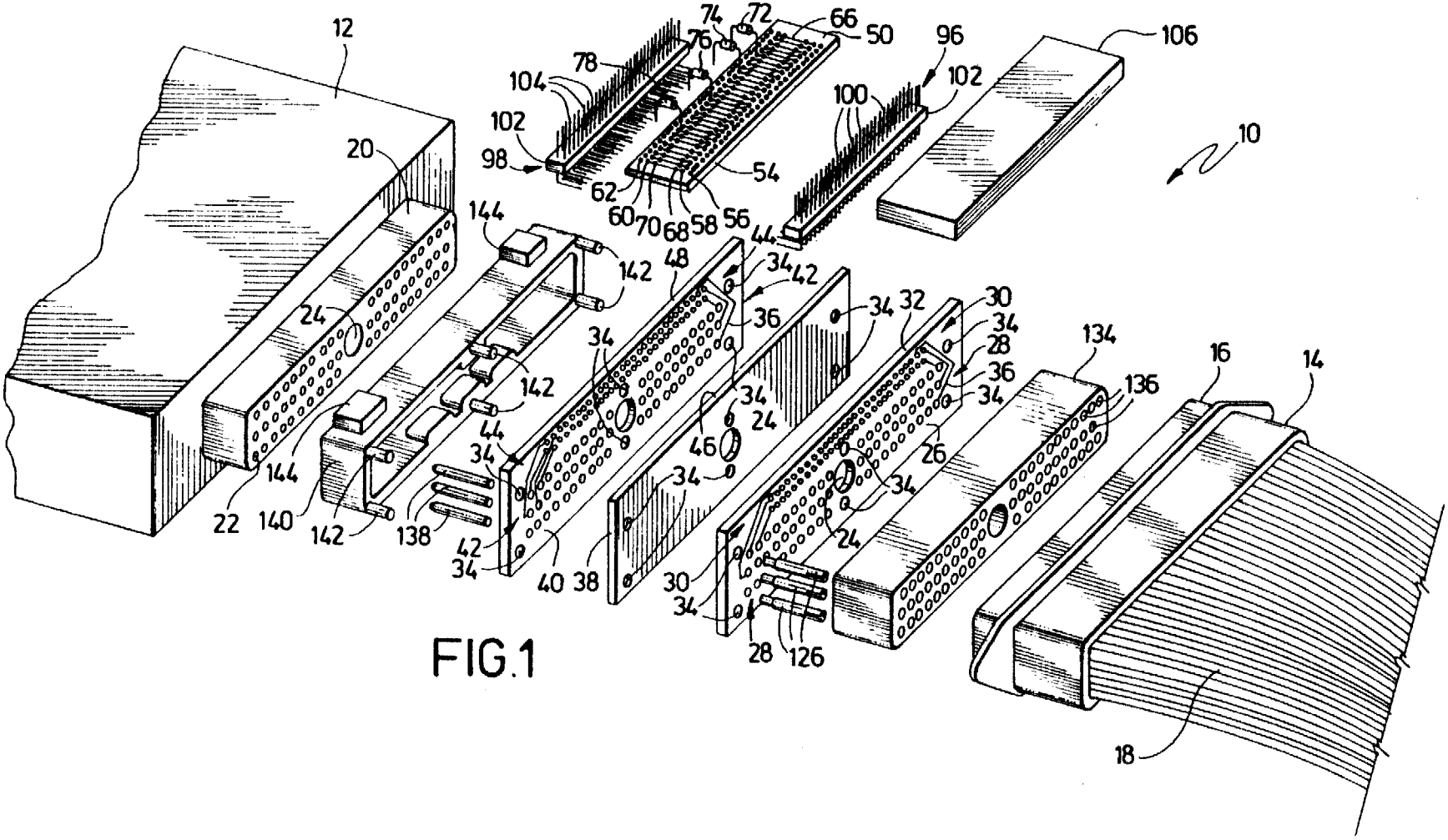
FIG. 1 is an exploded perspective view of the elements of the interactive connector unit between an electronic control assembly and a wiring harness.

In the description which follows, like parts are marked throughout the specification and drawings with the same reference numerals, respectively. The drawings are not necessarily to scale, and certain features of the invention may be exaggerated in scale or shown in schematic or diagrammatic form in the interest of clarity and conciseness.

FIG. 1 is an exploded perspective view of the interactive connector unit designated generally by the reference numeral 10. The pans of interactive connector unit 10 are spread out between an electronic control assembly 12 and its corresponding wiring harness 14. The open end 16 of wiring harness 14 contains an array of male conductor pins (hidden) for each of the sixty wires in wire bundle 18. Wiring harness 14 is a sixty pin connector.

Electronic control assembly 12 (ECA) has a pin receiving block 20 with a sixty pin array of female contacts which are designed to correspond with and engage the male connector pins of wiring harness 14. A large centralized opening 24 is threaded to receive a bolt or other fastener that may be used to secure wiring harness 14 in circuit completing position on pin receiving block 20 of electronic control assembly 12.

A first board means or element 26 has a first set of contact points indicated generally by the numeral 28. It has a first set of adapter points designated generally by the numeral 30. Board 26 is a rectangular-shaped board with spaced apart flat surfaces. First set of contact points 28 extend across the flat surface of the board in a sixty pin set. The set of adapter points 30 extends across the board on a flat surface adjacent to its upper edge 32 in a 60 pin array. Adjacent the four comers of board means 26 and spaced apart adjacent opening 24 are fastener openings 34. The center of the board has large opening 24 for the passage of a mounting bolt. Each of the individual contact points and the individual adapter points are electrically connected by traces, such as trace 36. While only a few of the traces are illustrated in FIG. 1 they are seen in plan view in their entirety in FIG. 3. Spaced apart from board means 26 by insulating sheet 38 is second board means 40 which is identical in size and layout with first board means 26. It has a second set of contact points indicated generally as 42, arranged in a sixty pin array on the flat surface of the board means. It has a second set of adapter points indicated generally by the arrows 44 extending across the flat surface of the board means. Traces 36 join individual ones of said contact points with individual ones of said adapter points as indicated in the plan view layout of FIG. 3. Second board means 40 is of rectangular shape having an upper edge 48 and spaced apart flat surfaces.

Array 44 of adapter points on second board means 40 extend along the flat surface of the board adjacent edge 48. Board means or elements 26, 40 have spaced apart flat surfaces, each of the array of contact points 28 on the first board element and each of the array of contact points 42 on the second board element comprise electrically conductive pin openings which extend through the board means between the flat surfaces. Each of the ones of the array of adapter points 30 on board means 26 and 44 on board means 40 comprise electrically conductive sockets which extend through the respective board means between the flat surfaces thereof.

Figure 4:
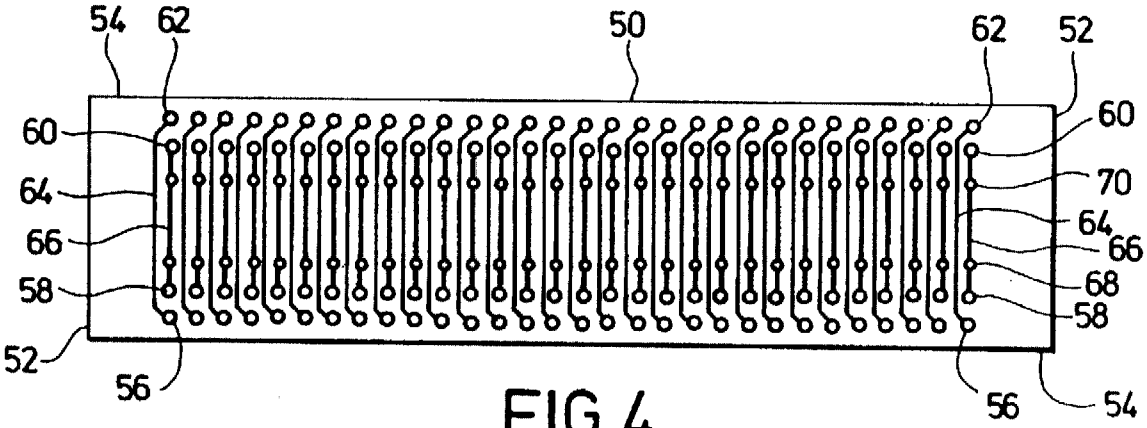
FIG. 4 is a layout of the spaced apart arrays of adapter points on the third board element.

The assembly further includes third board means 50 which is a rectangular-shaped board element having opposed spaced apart flat surfaces. As indicated in FIG. 4, it has opposed ends 52 and opposed longitudinal edges 54. Running adjacent to the edge 54 is a row of adapter points 56 and a parallel row of adapter points 58 which together make the third set of adapter points on the third board means. Adjacent an opposite edge 54 is a third row 60 of adapter points and a parallel row 62 of adapter points which extend along edge 54 of third means 50 and together constitute a fourth set of adapter points. The sets of adapter points 56, 58 and 60, 62 correspond respectively to the first and second set of adapter points and lie in spaced apart relationship with each other on the flat surface of board means 50. As indicated in FIG. 4, rows 56, 58, and 60, 62 each comprise 30 adapter points arranged in parallel rows spaced apart. Traces 64 (only some of which are numbered) are placed in each of the flat surfaces of third board 50 to electrically connect each of the adapter points in row 56 with each of the adapter points in row 62 as indicated in FIG. 4. These traces are not shown in the depiction of board element 50 in FIG. 1 for reasons of clarity but they are present in FIG. 1 just as shown in FIG. 4. Traces 66 are shown in FIG. 1 and in FIG. 4 joining each of the adapter points in rows 58 and 60, which are spaced apart.

A means for inserting circuit altering devices between selected ones of the third and fourth sets of adapter points comprise a row 68 and a row 70 of spaced apart conductive openings in selected ones of said traces. Here the spaced apart rows of conductive openings 68, 70 are located in half of the individual traces joining individual adapter points in rows 58 and 60. This provides a means for inserting circuit altering devices in every other of the third and fourth sets of adapter points. Traces 66 are thicker than traces 64 as indicated, which provides greater current carrying capacity and sufficient physical size to insure good electrical connections. Circuit altering devices 72, 74, 76, and 78 are seen in FIG. 1 ready to install in the third board means. This is accomplished by placing one of their leads in each of a pair of spaced apart conductive openings in row 68 and row 70. The trace between said openings is broken between a pair of adapter points in rows 58 and 60 in order to allow the circuit altering device to be effective.

Figure 3:
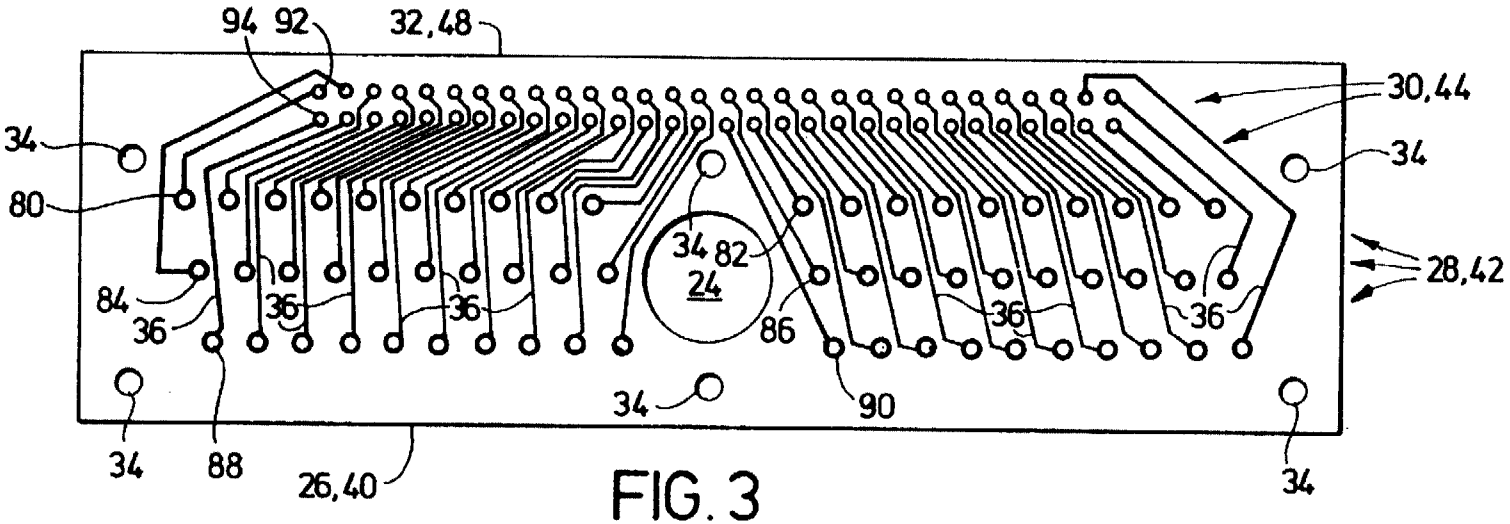
FIG. 3 is a layout of the array of the individual conductive pin openings and electrical conductive sockets on the first and second board elements.

In FIG. 3 is a plan view of the first and second board means 26, 40. The sets or arrays of adapter points 28, 42 comprise three parallel rows of individually separated spaced apart conductive openings arranged laterally of opening 24 as follows: Reading from left to right Row 80 comprises connection points 1 through 10; row 82 comprises points 11 through 20; row 84 comprises points 21 through 30; row 86 comprises points 31 to 40; row 88 comprises points 41 through 50 and row 90 comprises points 51 through 60 which corresponds to the placement and the numbering of the points indicated on the ECA connector shown in FIG. 5. Along the upper edge 32, 48 is a double row of adapter points comprising adapter sets 30, 64. These are rows 92, 94 each comprising 30 electrically conductive openings, arranged in parallel rows, generally parallel to the upper edges 32, 48 of first and second board means 26, 40. Each of the electrically conductive openings in rows 80, 82, 84, 86, 88, and 90 are connected by electrically conductive traces 36 connected to one of the electrically conductive openings in adapter points 30, 64 on each of board means 26, 40. Finally board means 26, 40 include a symmetrical pattern of six openings 34 for fasteners.

Returning now to FIG. 1 is seen a first set of electrical adapters 96 and a second set of electrical adapters 98. Electrical adapters 96 have a plastic element 102 which holds a plurality of stiff L-shaped conductors 100 with right angled arms arrange in pairs. Electrical adapter set 98 has a similar plastic element 102 which supports a plurality of similar stiff L-shaped conductors with right angled arms arranged in double rows with L-shaped conductors 100, 104 having horizontally arranged lower arms and vertically extending upper arms passing through plastic element 102. Plastic element 102 spaces the arms so that the horizontally extending arms on first electrical adapters 96 occupy all of the openings in the set 30 of adapter openings in the first board means. The second set 98 of electrical adapters are placed with the horizontal arms of L-shaped conductors 104 each occupying one each of the adapter points in set 44 of adapter points in the second board means. When the board means 26, 40 are placed together against insulator 38 with the electrical adapters in place, the third board means may be placed on the vertical arms of the L-shaped conductors with an L-shaped conductor of set 96 occupying each of the openings in rows 56, 58 and the vertical arms of L-shaped conductors 104 in set 98 occupying each of the openings in rows 60, 62 of the third board means to complete an electrical circuit between the three board means and in supporting contact of the third board element on each of the first and second boards. This forms a compact T-shaped arrangement with the flat surfaces of the third board at right angles to the flat surfaces of the first and second boards. A cap member 106 may then be placed over the third board element as indicated in FIG. 2.

Figure 2:
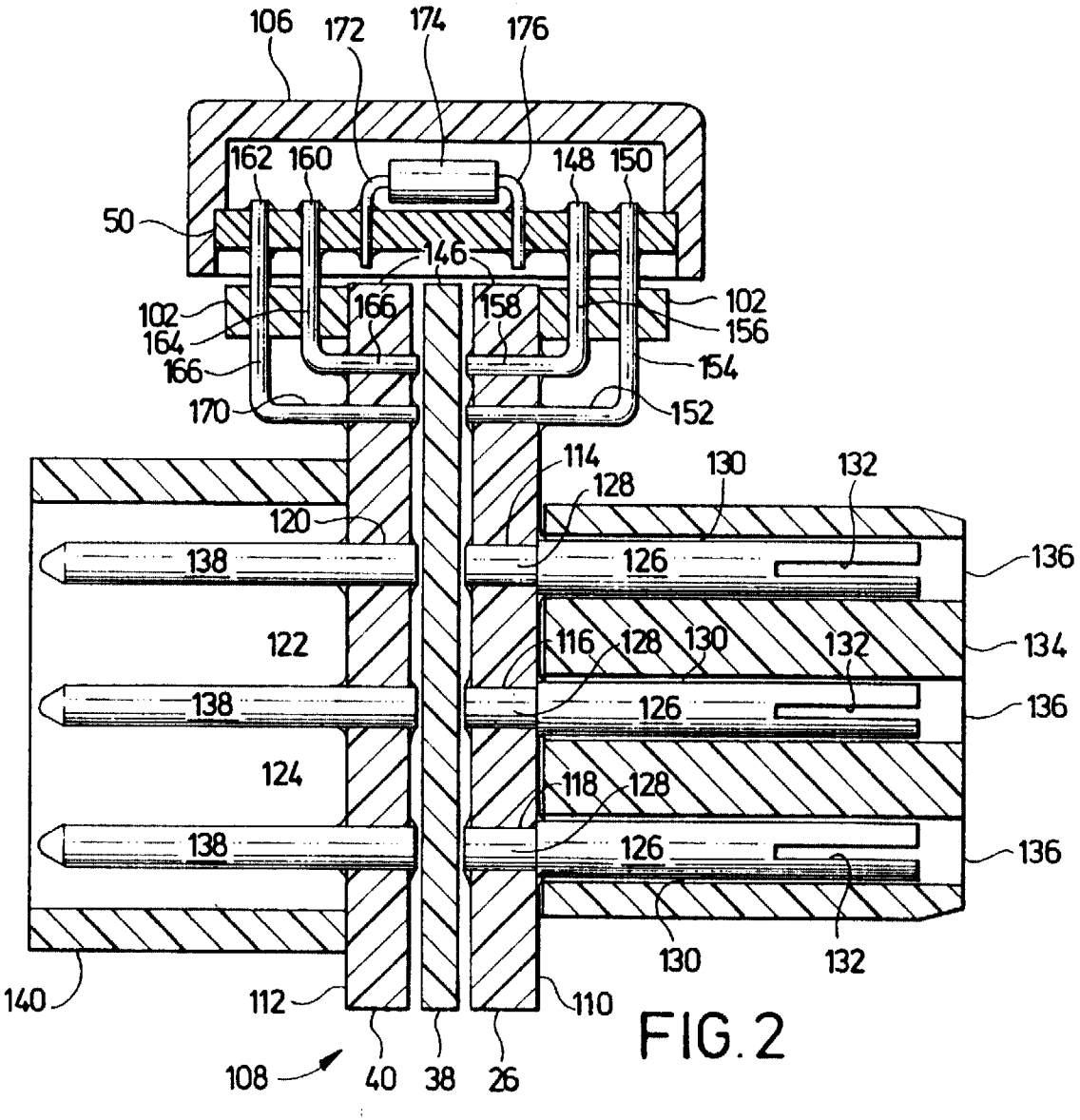
FIG. 2 is an elevation view in cross-section of the assembled modular interactive connector unit or inline adapter.

The compact T-shaped arrangement of the modular interactive connector unit is seen in assembled cross-section in FIG. 2. The base block is indicated generally by the reference numeral 108. First board means 26 and second board means 40 are mounted together with insulator sheet 38 as indicated in FIG. 2. Base block 108 has outside opposed surfaces 110 and 112. Board means 26 has conductive opening 114 from row 82, conductive opening 116 from row 86 and conductive opening 118 from row 90. Board means 40 has conductive opening 120 from row 82, conductive opening 122 from row 86 and conductive opening 124 from row 90. The conductive openings 114, 116, 118 are in generally opposed horizontal and vertical alignment with the respective openings 120, 122, and 124. They are representative of each of the openings in the contact points in the sixty set array shown in FIG. 3. Each opening in rows 80, 82, 84, 86, 88 and 90 have installed therein a female pin 126 having a hole fitting portion 128 at the end of a shouldered shank portion 130 which also has a slotted portion 132 on the male pin receiving end. The pins extend most of the way through a pin receiving block 134 also seen in FIG. 1. Pin receiving block 134 has sixty pin receiving openings 136 extending therethrough as indicated in FIGS. 1 and 2. Pin receiving block 134 may be adhesively secured to surface 110. It is made of an insulator material, such as hard plastic, so as to insulate every pin from its neighbor. It is adapted to fit inside the open end 16 of wiring harness 14. Male pins on wiring harness 14 in a similar pattern with female pins 126 allow the wiring harness to be placed in electrical contact with a male pin in each female pin.

Board means 40 of base block 108 has in each conductive opening of each contact point, a male pin 138. Male pins 138 are received in the openings 120, 122, 124 and the other of the sixty openings in the array 42 of element 40. Thus, sixty of the pins 126 fit in the sixty openings of the first set of contact points in board means 26 and sixty of the pins 138 fit in the sixty openings of the second of contact points 42 in board element 40. Insulating shell element 140, suitably made of hard plastic, surrounds the array of pins 138 mounted in the openings of surface 112 of the base block 108. Shell 148 has fasteners 142 which pass through the openings 134 of elements 26, 38 and 40 as is indicated in FIG. 1 and may mechanically or adhesively hold the elements of the base block together. Shell 140 is adapted to slip over the pin receiving block 20 in friction fit, with each of the pins 138 being received in a female contact 22 in pin receiving block 20. Shell 140 may have guide receiving elements 144 to be received in a metal covering of the electronic control assembly (not shown) so that the pins 138 will line up easily with the openings 22 in pin receiving block 20.

The upper edge of base block 108 is designated 146 as indicated in FIG. 2. It is comprised of the upper edge portions 32 and 48 of first and second board means respectively and the upper edge 46 of the insulating board 38 as indicated in FIG. 1. The set of L-shaped conductors 100 (FIG. 1) has an inside row having thirty L-shaped conductors 148 and an outside row having thirty L-shaped conductors 150 arranged in plastic member 102. L-shaped members 150 have a horizontal portion 152 and a vertical portion 154. Pins 148 have a vertical portion 156 and a horizontal portion 138. There is a pin 150 for every conductive opening in row 94 of board element 26 and a pin 148 for every opening in row 92 of board element 26. There is a pin 150 for every opening in row 56 of board element 50 and a pin 148 for every opening in row 38 of board element An inside row 160 of L-shaped conductors in set 104 is seen extending between board element 40 and board element 50. An outside row 162 of L-shaped conductors is similarly seen extending between board elements 40 and 50. L-shaped conductors 160 have a vertical portion 164 and a horizontal portion 166. L-shaped conductors 162 have a vertical portion 166 and a horizontal portion 170. The horizontal portion 170 of the conductors 162 are placed in the openings of the row of adapter points 94 in board element 40 and the horizontal portion 166 of pins 160 are placed in the openings of the row 92 of the adapter openings in said board element. Vertical portions 164 are placed in the adapter openings of row 60 of board element 50 and the vertical portions 166 of L-shaped conductors 162 are placed in the adapter openings of row 62 in board element 50. The sets of L-shaped conductors are spaced apart and insulated by plastic elements 102 as indicated in FIG. 2.

Circuit altering element 174 is seen in FIG. 2 to generally indicate any of the circuit altering elements 74, 76, or 78 shown in FIG. 1. It has a lead 172 passing through one of the openings in row 70 of board element 50 and another lead 176 shown passing through one of the openings in row 68 of board element 50. Leads 172 and 176 are normally soldered into opposed space apart openings in rows 70 and 58 of board element 50 along an electrically conductive trace. Although the electrically conductive trace is not shown in FIG. 2, it electrically connects ones of the conductors 148 and 160 with the leads of the circuit altering devices 174 which may be placed between the spaced apart openings 68, 70 along board element 50. The trace that would be directly underneath circuit altering device 174 is the mechanically broken so that the circuit altering device, such as device 174, can have its circuit altering effect. This may be done conveniently by cutting a portion of trace 66 or by drilling a hole through the trace and through board element 50. To reconnect it in order to disable a circuit altering device 174, the hole can be plugged and the circuit reestablished by resoldering the trace. This is preferably accomplished after removing a circuit altering device 174 but it can be done even with circuit altering device 174 in place by what amounts to a short-circuiting of the leads 172 and 176.

Figures 5, 6, 7, 8:
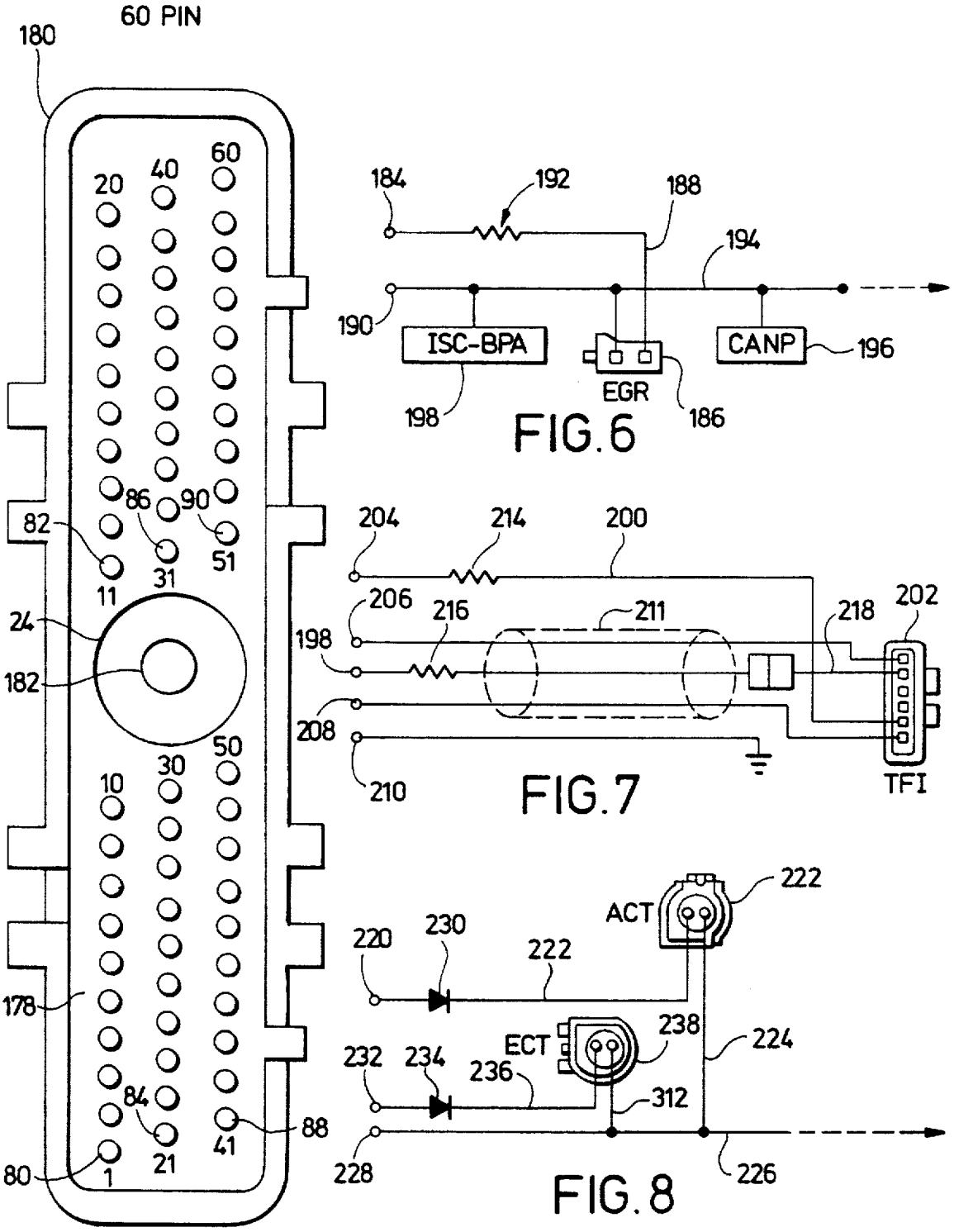
FIG. 5 is a view of the end of a sixty pin connector used on the automotive electronic control assembly and wiring harness.
FIG. 6 is a partial electrical schematic of a control element of a Ford engine with a circuit altering device.
FIG. 7 is a partial electrical schematic of a control element of a Ford engine with a circuit altering device.
FIG. 8 is a partial electrical schematic of a control element of a Ford engine with a circuit altering device.

FIG. 5 is a representation of a sixty pin connector 178 such as may appear on an electronic control assembly or a wiring harness in a motor vehicle made by the Ford Motor Company. Row 80 of contact or connector pins consist of pins 1–10 numbered as indicated in FIG. 5. Row 82 has pins 11–20. Row 84 has pins 21–30, row 86 has pins 31-40, row 88 has pins 41–50 and row 90 has pins 51–60. The pins are surrounded by a shell 180 and has the generally centralized fastener opening 14 having fastener 182. Attached hereto is a Ford Motor Company electrical schematic identified as EEC-IV-Engine Supplement-Passenger Car, 17-33 for 5.0 L, S.E.F.I., Thunderbird/Cougar, Mustang. Typewritten at the bottom of this electrical schematic is "1988 Ford E.C.A. with factory settings". 5.0 L refers to an engine with 5 liter capacity and S.E.F.I. means sequential electronic fuel injection. It has the same sixty pin connector schematically illustrated at the side of the schematic diagram. These show the factory settings. Also attached hereto is a duplicate of the electrical schematic just identified which has typed at the bottom thereof the identifying number, 8875A. This has handwritten thereon certain exemplified circuit altering elements at pins identified as pin 7, pin 25, pin 36, and pin 33. Circuits for pins 7 and 25 have added the symbol for a diode and circuits for pins 36 and 33 have added the symbol for a resistance element. These are devices which are added by means of the modular interactive connector unit, which is the present invention, to exemplify the use of the device. Information is taken from this electrical schematic and set out separately in FIGS. 6, 7, and 8. FIGS. 6, 7, and 8 are thus only partial electrical schematics for certain control circuits for cars equipped with the 5.0 liter sequential electronic fuel injection engine provided by Ford.

FIG. 6 illustrates pin 33 indicated at 184. 186 is the exhaust gas recirculation regulator (EGR) to which circuit wire 188 is connected. Pin 184 goes to the electronic control assembly. Numeral 190 represents a vehicle power circuit (pin 37) which is a constant 14.5 volt signal and is used as one lead for a variety of devices as indicated in the attached electrical schematic. Circuit altering device 192 is placed between the control device 186 and the electronic control assembly in line 188. Circuit altering device 192 is a 40 Ohm resistor of ¼ watt capacity which has the effect of reducing the factory voltage to the EGR from about 14.2 volts to about 14 volts. The exhaust gas recirculation solenoid operates a controlled vacuum bleed located between the solenoid and the EGR valve. As the throttle position sensor (TPS) detects partial acceleration or the manifold air pressure (MAP) sensor detects a load on the engine, the EGR solenoid sends a voltage signal to the controlled vacuum bleed which partially opens a plunger in the unit allowing up to six inches of vacuum, which under factory operating conditions operates the EGR valve to re-circulate diluted exhaust gas back into the combustion chamber. By installing the resistor 192 the vacuum is reduced to about 2.5 inches which has the effect of reducing the exhaust gas-recirculation by more than 50%. This change has the effect of improving performance which may be useful for competition or off road usage. Several items are shown schematically in block diagram connected to common line 194. Reference number 196 is the canister purge solenoid (CANP) and 198 is the idle speed control bypass air (ISC-BPA). These units are not effected by the addition of resistor 192.

In FIG. 7 is seen a circuit which controls spark timing. Terminal 36 is indicated at 198. It is connected through line 218 to the thick film integrated circuit (TFI) ignition module. The ignition module is labeled 202. Terminal 36 is the spark out (SPOUT) signal which controls spark timing (rate of advance or retard) through the TFI module. The TFI ignition module is a self-contained input-output device which measures engine speed or revolutions and sends the information to the electronic control assembly. The electronic control assembly using programmed instructions sends electronic signals back to the (CTFI) through the spark output circuit to control the time of firing for each cylinder and the amount of retard at wide open throttle. Pin 4 is identified at 204 and pin 56 is identified at 206 as profile ignition pickup (PIP) which counts revolutions of the crank shaft. Pin 16 (ignition ground) is identified at 208 and pin 20 is identified as case ground at 210. The dotted cylindrical area 211 is a factory diode. A factory installed resistor 214 is in line 200 and a circuit altering device 216 is in line 218 connected to module 202.

Circuit altering device 216 is placed in the position of circuit altering device 174 in FIG. 2 to be installed in the interactive module of the invention. Circuit altering device 216 is a 30 Ohm resistor with ¼ watt capacity. It has the effect of altering the voltage at pin 36 from approximately 6.10 volts to 5.97 volt the engine under load at 2,000 rpm. Because pre-ignition detonation can be damaging to the entire drive and valve train, the electronic control assembly has programmed instructions to retard the timing 8° anytime it detects wide open throttle from the throttle position sensor (TPS). By installing the resistor 216 in the spark out circuit, the rate of advance is increased and the amount of retard at wide open throttle is reduced to 4°.

Referring now to FIG. 8 is seen pin 25 identified as reference numeral 220 in line 222 leading to the air charge temperature sensor (ACT) identified as 222. Through line 224 the air charge temperature sensor is connected to line 226 which is a base line leading to pin 46 identified as reference numeral 228. Circuit altering element 230 is connected to line 222. Element 230 is not present in the factory installation. It is added through the invention herein. Element 230 is a 600 volt 1 amp silicon diode which has the effect of changing the voltage in line 22 from about 3.07 volts at idle cold to about 3.45 volts and from about 0.945 volts at idle warm to about 1.22 volts. A constant 5 volt signal is being sent from the electronic control assembly and reduced through a built-in resistor as air temperature in the intake manifold increases. By installing a diode in the line, the 5 volt signal going to the electronic control assembly is resisted which in turn raises the voltage read by the electronic control assembly. Because the electronic control assembly believes the engine is cooler than it actually is, it adjusts other factors such as timing, air/fuel ratio, etc. accordingly.

Also in FIG. 8, pin 7 is designated by the reference numeral 232. A diode identical to 230 is identified by the reference numeral 234. It is in line 236 leading to the engine coolant temperature sensor (ECT) designated by reference numeral 238. It is connected by line 312 to base line 226 leading to pin 46 identified by the numeral 228. Terminal 7 is the input return for the engine coolant temperature sensor (ECT) which effects outputs relating to functions such as air to fuel ratio, spark timing, loop operation, etc. By installing a circuit altering device 234 in the circuit leading to the ECT the factory voltage of 3.13 at idle cold and 0.715 at idle warm is raised respectively to 3.6 and 1.17 volts respectively. These changes make the readings from the sensors 222, 238 consistent as far as the electronic control assembly is concerned which makes its normal adjustments based upon indications that the engine is somewhat cooler than it really is, which has the effect of improving the engine performance under start up conditions. Note that the invention makes it possible to alter the normal factory control and sensing circuits without any damage whatsoever in the electronic control assembly itself. Consequently, if it is desired at any time to return everything to factory settings the module unit of the invention is simply removed and the wiring harness reconnected directly to the electronic control assembly.

Thus it is seen that the present invention provides an inexpensive modular assembly which is interposed between the electronic control assembly and the sensors connected there, to in order to control an operating element such as a solenoid or to alter the signal received from a sensor that through the electronic control assembly controls one or more of the operating parameters of the engine. The operating parameters discussed above and illustrated in FIGS. 6, 7 and 8 have been altered through the use of the present invention and the present invention makes it possible to alter additional ones as well by installing additional circuit altering devices in board element 50 to alter performance of the automobile engine or other operating assemblies which are connected to an electronic control assembly. While the specific values that have been disclosed are considered to be engine performance enhancers, other or different values could be chosen and different circuit altering devices could be easily installed using the device of the present invention.

A modification of the present invention has been considered which simplifies the construction of the board elements 26, 40 and 50. In the modification the traces 66 on board element 50 are continued in a line (vertical in FIG. 4) between the individual openings of rows 58 and 56 and between the individual openings of row 60 and 62. The same number of openings and the same physical arrangement are present except that traces 64 on board element 50 are eliminated. On board elements 26, 40 illustrated in FIG. 3, each of the opposed openings in row 94 and row 92 of the adapter points are connected by traces therebetween (vertical in FIG. 3). Some of the traces 36 are eliminated in selected ones of the sets of contact points 28, 42 leading to the adapter points 30, 64. The board element 26 and the board element 40 have the same number of contact openings but the selected ones, which do not have traces leading to the adapter points 30, 64, are connected directly by a modified pin. The modified pin comprises a combination of female pin 126 and male pin 138 joined across and through holes drilled in insulating board 38. The modified pins are suitably lengthened as necessary so that an electrical contact will be made straight through base block 108 in FIG. 2. The distal end of hole fitting portion 128 of pins 126 is extended and electrically connected to the non-pointed opposite end of pins 138 joined through insulator 138. Then the selected contact openings of rows 80, 82, 84, 86, 88 and 90 of board elements 26, 40 can be connected straight through between the wiring harness and the electronic control assembly. The selected contact openings in the contact array do not have traces leading to the openings of the sets of adapter points. When the base block unit is assembled with the modular unit in place between the wiring harness 16 and the control assembly 12, the extended pins will provide a means for connection of the wiring harness straight through the base block to the electronic control assembly by means of the modified pins. Those circuits will be fixed and not connected through the adapter points so they will not be alterable by circuit altering elements. This will allow more room for the traces of the ones of the contact points which are still connected to adapter points. Half of them are still connected through the adapter points so it will still be possible to alter half of the circuits in the 60 pin array with the other 30 selected pins being connected directly through the modified pin means. It can be seen that the selected ones of the contact points could be other than half the number in the 60 pin array depending on how many of the traces between individual contact points and adapter points are eliminated. The device works just the same as previously disclosed except that there are fewer circuits that may conveniently be altered selectively.

More particularly, with respect to FIGS. 9 through 12 the modified invention is illustrated wherein the layout of the contact points and adapter points in terms of number and spacing is exactly as shown in FIG. 3 but only half of the traces are present and the tracing pattern is different. Consequently subscripts "a" will be used to mean the same parts as previously identified because the individual parts are essentially the same, except for the modified pin in FIG. 11. The assembly is completed in the same way as in FIGS. I and 2.

Figure 9:
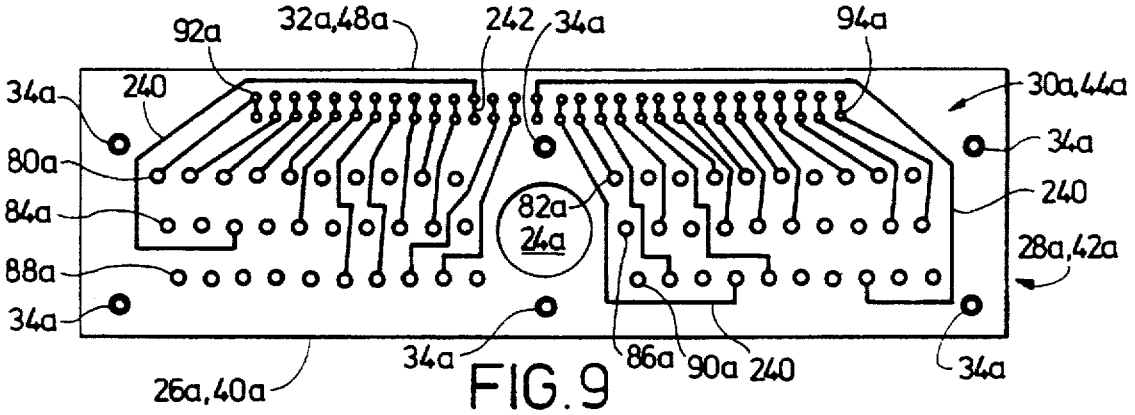
FIG. 9 is a layout of the array of contact points and adapter points in the modified embodiment showing half of the contact points being contact openings without traces.

In FIG. 9 a first board means and a second board means 26a, 40a, each comprising insulating means which support and insulates connections, have respectively upper edges 32a, 48a and fastener openings 34a with large threaded opening 24a. Each of the first and second board elements 26a, 40a have a plurality of electrically conductive pin openings comprising rows 80a, 82a, 84a, 86a, 88a and 90a which comprise the same rows of contact points as previously described without the subscript letters. Rows 80a, 82a, 84a, 86a, 88a, and 90a, comprise a first set or array of contact points 28a on the first board means and a second set or array of contact points 42a on the second board means. Half of the contact points have traces 240, only a few of which are marked in FIG. 9.

Traces 240 are electrically conductive traces which connect selected contact points of the set or array 28a to the first set of adapter points 30a on first board means 26a. Another set of traces 240 connect selected contact points of the set or array 42a to the second set of adapter points 44a on second board means 40a. Each set or array of adapter points comprises a row of 30 spaced apart adapter points 92a and a row of thirty spaced apart adapter points 94a comprising an array of sixty adapter points for each board element. The adapter points are arranged near the top edge 32a or 42a of each board 26a, 40a. However, each of the adapter points in rows 92a are electrically connected to one of the adapter points in row 94a by means of a plurality of traces 242 as indicated in FIG. 9.

As is evident, the traces 242 mean that each vertically adjacent adapter point in rows 92a and 94a will be connected electrically to a single contact point of rows 80a through 90a. Thus it would be possible to reduce the array of adapter points 30a, 44a (Rows 92a, 94a) to a single row of thirty adapter points which would serve the same purpose. A selected one of the contact points through a selected trace on one of board elements 26a, 40a would serve to provide a means for altering a circuit through a third board element shown in FIG. 10.

The assembly of the board elements 26a, 40a is as shown in FIG. 2 in which an inside row 148 and an outside row 150 of L-shaped conductors have horizontal portions 152, 158 installed in the double row array of adapter points along the top edge of board element 26a. On the opposite board element 40a horizontal portions 166, 170 of stiff L-shaped conductors will occupy each of the adapter points in rows 92a, 94a, when the unit is assembled as in FIG. 2 and FIG. 12.

Figure 10:
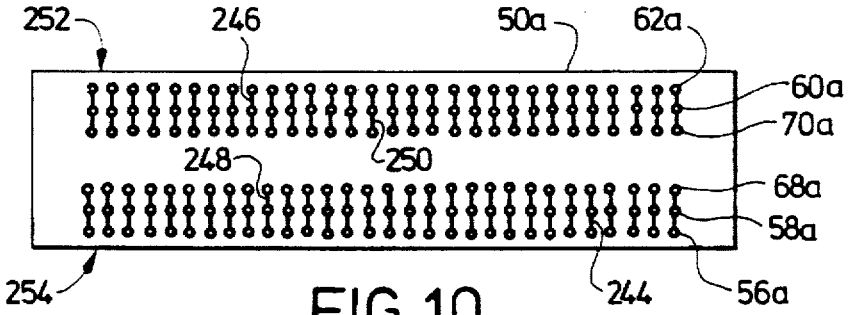
FIG. 10 is a layout of the arrays of spaced apart adapter points of the third board means useful with the modified invention.

The third board element 50a of FIG. 10 has a first row of adapter points 56a, a second row of adapter points 58a, a third row of adapter points 60a, and a forth row of adapter points 62a. Each row consist of thirty points regularly spaced apart across board element 50a, as in FIG. 4, except that the third board element of FIG. 10 has traces 244 joining pairs of adapter points in rows 56a and 58a, one above the other, and traces 246 joining pairs of adapter points, one above the other, in rows 60a and 62a.

By reference to FIG. 2 it is seen that vertical portions 154 of L-shaped wires 150 fit adapter points in rows 56a or 62a depending upon orientation of the third board element shown in FIG. 10. Vertical portions 156 of L-shaped wires 148 would fit one of the adapter points in row 58a or 60a, again, depending upon orientation. Similarly, the vertical portions of stiff wire connectors 160 and 162 fit the adapter points along the opposite side edge of the third board element. As indicated by FIG. 2, this creates electrical contacts but also important provides a sturdy mechanical structure to support the third board element in close proximity to the base block. The base block comprises board elements 26a, 40a with an insulating board member 38a mounted between as indicated in FIG. 2. When the ends of the L-shaped conducters are soldered in, a very sturdy T-shaped compact structure is established.

Other traces 248 connect each adapter point in row 58a with one of a row of spaced apart conductive openings 68a. Conductive openings in row 70a are spaced apart opposed from row 68a. Conductive traces 250 connect each conductive opening 70a to one of the adapter points in row 70a. The term conductive opening is interchangeable with adapter point and all form part of opposed sets of arrays of adapter points on the third board means 50a.

Third board means 50a differs from board means 50 in FIG. 4 in that each of the trio of vertically arranged openings in each opposed array of adapter points on the surface of board 50a in FIG. 10 are connected together by one of the traces 244, 248 and on the opposed side by one of the traces 246, 250. The last set of points (conductive openings) opposed in rows 68a, 70a, are spaced apart from each other with an insulating gap between them.

It is easy to understand that circuit altering devices 174 shown in FIG. 2 would have leads 172, 176 connected to any one of the openings in the directly opposed sets of adapter points along either side of the surface of board 50a in FIG. 10, as was the case in the previous embodiment shown in FIG. 1. Because there are no traces between the opposed arrays of adapter points on board 50a, it is not necessary to drill out traces when installing a circuit altering device. On the other hand, until a circuit altering device (or alternately a direct connection is added), the circuits through these individual opposed triplicate points in the opposed arrays of adapter points on board 50a would be in open circuit condition. An added conductor or circuit altering device will complete each such circuit.

Figure 11:
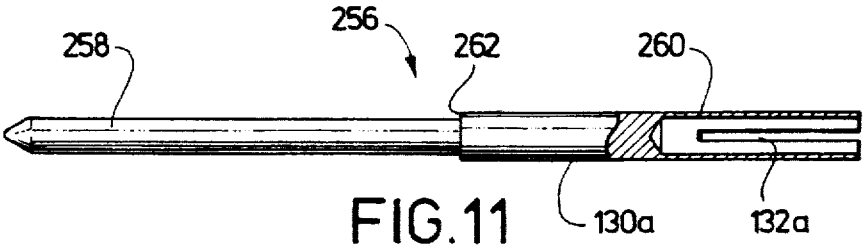
FIG. 11 is a side view of a modified connector pin with a female portion and a male portion which is extended in length.

Direct connection between the wiring harness and electronic control assembly is accomplished through the use of modified pins in the contact point openings of contact points which do not have traces. The modified pin 256 is shown in FIG. 11. It is also seen in assembly in FIG. 12 which is the cutaway bottom portion of the assembled base block shown in FIG. 2.

Modified pin 256 has an extended male portion 258 and a female portion 260. Female portion 260 has a shouldered shank 130a and slotted portion 132a with a shoulder at 262. The slotted portion 132a surrounds an opening for receiving a male pin from one of the wiring harness or electronic control assembly. Up to the shoulder portion 262, the female portion 260 of the modified pin is exactly like the female pin 126 previously discussed. The shoulder 262 fits up against an outside surface 110, 112 depending upon whether the pin is inserted in the position shown in FIG. 12 or reversed and inserted in the opposite direction if that might be desirable.

Figure 12:
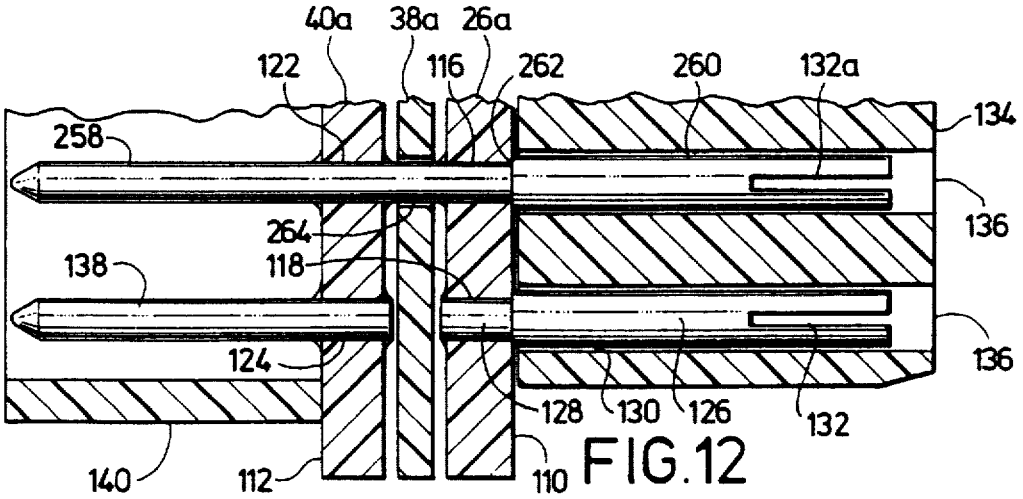
FIG. 12 is a partially cut away side view of the structure of the base block shown in FIG. 2 with a modified pin of FIG. 11 shown located above individual male and female pins all usable in the sixty pin array.

The male pin portion 258 is extended in length to pass through a conductive opening such as opening 116 in board element 26a, through an opening in modified insulating board 38a, and through a conductive opening 122 in board element 40a, so that the male portion 258 is exactly the same as the extending male portion of standard male pin 138 in FIG. 12. Openings, such as opening 122 and opening 116 need not be conductive openings, which have been referred to as contact openings, although it is preferable to have then contain a thin wall of solder which makes it possible to solder them in position in the assembled base block of FIG. 12. This helps provide rigidity to the structure and prevents the pin from pulling out when the inline adapter is installed or removed. The modified pins need not have electrical contact at the openings, such as openings 116, 122, because the modified pin is used in contact openings that do not have any traces. The modified pin is itself a straight through conductor which serves to close one of the circuits through the base block when the wiring harness and electronic control assembly are connected to it. The contact openings are those without traces leading to one of the adapter points, each of which is to have a modified pin if all of the circuits are to be completed.

The assembled unit as in FIGS. 2 and 12, preferably still has the pin receiving and holding block 134 with pin receiving openings 136 which will have ordinary female pins 126 for the contact points having traces leading to adapter points or modified pin 256 for the contact point openings which do not have such traces. The shell 140 is still preferably utilized over the array of male pins which constitute a means for connection with a wiring harness or electronic control assembly, whichever has female connectors.

The male portion 258 of modified pins 256 and the male pins 138 constitute male connecting means for individually connecting the array of contact points of a board element with one of a wiring harness or electronic control device. The female portion 260 of the modified pins 256 together with the female pins 126 constitute a female connecting means for individually connecting the array of contact points on one surface of an insulating board means with one of a wiring harness or electronic control assembly device. The contact points without traces leading to adapter points together with the modified pins 256 provide a modified connecting means, which defines a direct connection in selected circuits.

The insulating means 38a may have openings 264 directly opposed to the openings of the array of contact points in the assembly of FIGS. 2 or 12 only where the modified pins are used or preferably everywhere so that alterations in the assembly can be made without drilling further holes. The presence or absence of a hole in insulating means 38a in line with contact points such as conductive openings 118, 124 does not effect the use or operation of the ordinary male and female connecting pins 138, 126 as previously discussed. If a modified pin 256 is used in one of the contact point openings which has traces leading to the adapter points it will operate in effect as a short circuit which will neutralize the effect of any circuit altering devices which may have been installed between the opposed adapter points on the third board element to which the traces lead. Consequently it can be used to neutralize a circuit altering device previously employed without actually removing the affected circuit altering device from the third board element of FIG. 10. The modified pins provide greater flexibility in the layout, alteration and operation of the inline adapter.

We claim:

1. An interactive connector unit insertable between a wiring harness and an automotive electronic control assembly of the type which receives input from sensors of operating parameters and produces control signals in response thereto, the connector unit in operable combination comprising:

first board means for electrically interconnecting a first set of contact points with a first set of adapter points, each contact point being connected to one of said adapter points;

second board means for electrically interconnecting a second set of contact points with a second set of adapter points, each contact point being connected to one of said adapter points;

third board means for electrically interconnecting spaced apart third and fourth sets of adapter points which correspond to said first and second set of adapter points;

means on said third board means for inserting circuit altering devices between selected ones of said third and fourth sets of adapter points;

electrical adapters for completing the circuit between individual ones of the adapter points on the first board means with individual ones of the adapter points on one of the third or fourth sets of adapter points on the third board means and between individual ones of the adapter points on the second board means and individual ones of the other of the third or fourth sets of adapter points.

2. The unit of claim 1 wherein said first and second board means are insulating boards having conductive traces joining individual ones of said contact and adapter points which comprise sets of conductive openings.

3. The unit of claim 2 wherein said third board means comprises an insulating board having conductive traces between individual ones of said third and fourth sets of adapter points which comprise sets of conductive openings.

4. The unit of claim 3 wherein the means for inserting circuit altering devices between selected ones of said third and fourth sets of adapter points comprise spaced apart conductive openings in selected ones of said traces.

5. The unit of claim 4 wherein said first and second board means are rectangular insulating boards mounted together with an insulator sheet in a rectangular shaped base block with the first and second sets of adapter openings arranged on opposite surfaces along one edge of the base block.

6. The unit of claim 5 wherein the outside opposed surfaces of the base block contain generally opposed ones of the conductive openings in said first and second sets of contact points of the first and second board means.

7. The unit of claim 6 wherein the circuit completing electrical adapters are stiff wires which support the third board means relative to the first and second board means and in close proximity thereto.

8. The unit of claim 7 wherein the third board means is covered by a cap member.

9. The unit of claim 7 wherein the circuit completing electrical adapters are stiff L-shaped conductors with right angled arms, one of the arms of one group being connected to the individual ones of the first set of adapter points extending above said one edge of the base block and one of the arms of a second group being connected to the individual ones of the second set of adapter points extending above said one edge of said base block, the other arm of the respective circuit completing adapter groups being connected to individual ones of the conductive openings of the third and fourth sets of adapter points on the third board means to support said third board means adjacent said one edge of the base block in a compact T-shaped arrangement.

10. The unit of claim 7 wherein conductive openings of the contact points on one of the first or second board means have male circuit connecting pins for connecting one of the electronic control assembly or the wiring harness, whichever has female connectors, and the other of the first or second board means has mounted thereon a pin receiving block having openings over each conductive opening of the compact points on said board means and the openings of said pin receiving block have inserted therein a cylindrical conductor for receiving male connector pins from the other of the electronic control assembly or wiring harness, whichever has male connector pins.

11. The unit of claim 10 wherein said male circuit connecting pins are surrounded by a protective shell which slides over an extension of a portion of the wiring harness or electronic control assembly having female connectors.

12. The unit of claim 11 wherein the third board means is covered with a cap member sealed around the rectangular edges of the board.

13. The unit of claim 10 further including at least one circuit altering device connected between said third and fourth adapter points in one or more circuits having a remote sensing element leading to a wiring harness, the unit being connectable between said wiring harness and an electronic control assembly to alter the electrical characteristics of said circuits.

14. The unit of claim 13 wherein the circuit altering device is selected from a group comprising resistors, diodes, transistors, and capacitors.

15. The unit of claim 10 having at least one control circuit alteration device connected between said third and fourth adapter points, the unit being connectable between an electronic control assembly and a wiring harness in one or more circuits leading to one or more remote control devices.

16. The unit of claim 15 wherein the circuit altering device is selected from a group comprising resistors, diodes, transistors, and capacitors.

17. An interactive connector unit insertable between a wiring harness and an automotive electronic control assembly of the type which receives input from sensors of operating parameters and produces control signals in response thereto, the connector unit in operable combination comprising:

a first board element having a plurality of electrically conductive pin openings each connected to one of an array of electrically conductive sockets;

a second board element insulated from said first board element, having a plurality of electrically conductive pin openings each connected to one of an array of electrically conductive sockets;

a third board element separated from said first and second board elements having opposed spaced apart arrays of electrically conductive sockets, one laid out to correspond with the array on the first board element and one laid out to correspond with the array on the second board element;

traces connecting the opposed spaced apart arrays of conductive sockets including spaced apart conductive openings in the traces, said conductive openings having several input or output circuit altering devices;

means for connection of each of said arrays on said third board element with a corresponding array on the first and second board elements;

means for connection of the pin openings on one of said first and second board elements to an automotive electronic control assembly; and, means for connection of the pin openings on the other of said first and second board elements with the wiring harness for said electronic control assembly.

18. An inline adapter for conveniently altering electrical characteristics of selected ones of a plurality of circuits each defined by one of a bundle of wires having a disconnectable pin and socket wiring harness having a pin and corresponding socket for each wire, comprising:

a first insulating means having a first surface and a spaced apart second surface;

male connecting means for individually connecting the socket side of a wiring harness to a plurality of separated contact points on the first surface of said insulating means;

female connecting means for individually connecting the pin side of a wiring harness to a plurality of separated contact points on the second surface of said insulating means;

traces on said first surface leading from the contact points to means for connection on said first surface and traces on said second surface leading from the contact points to means for connection on said second surface;

a second insulating means having separated spaced apart first means for connection and second means for connection, said first means for connection corresponding to the means for connection on said first surface and said second means for connection corresponding to the means for connection on said second surface;

connector means for connecting the first means for connection on the second insulating means to the means for connection on the first surface of the first insulating means;

connector means for connecting the second means for connection on the second insulating means to the means for connection on the second surface of the first insulating means;

pathway means for electrically joining the first and second means for connection on the second insulating means including means for selectively inserting circuit altering devices between said first and second means.

19. An interactive connector unit insertable between a wiring harness and an automotive electronic control assembly of the type which receives input from sensors of operating parameters and produces control signals in response thereto, the connector unit in operable combination comprising:

first board means for electrically interconnecting a first set of contact points with a first set of adapter points, each contact point being connected to one of said adapter points, further including a first set of contact openings which together with the first set of contact points forms a first contact point array;

second board means for electrically interconnecting a second set of contact points with a second set of adapter points, each contact point being connected to one of said adapter points, further including a second set of contact openings which together with the second set of contact points forms a second contact point array;

third board means having spaced apart third and fourth sets of adapter points which correspond in number to said first and second set of adapter points;

electrical adapters for completing the circuit between individual ones of the adapter points on the first board means with individual ones of the adapter points on one of the third or fourth sets of adapter points on the third board means and between individual ones of the adapter points on the second board means and individual ones of the other of the third or fourth sets of adapter points;

means on said third board means for inserting circuit altering devices between selected ones of said third and fourth sets of adapter points;

means for connecting the first contact point array on the first board means to one of the wiring harness or electronic control assembly; and, means for connecting the second contact point array on the second board means to the other of the wiring harness or electronic control assembly.

20. The unit of claim 19 wherein said first and second board means are insulating boards having conductive traces joining individual ones of said contact and adapter points which comprise sets of conductive openings in said contact point arrays.

21. The unit of claim 20 wherein said third board means comprises an insulating board having conductive openings in individual ones of said third and fourth sets of adapter points which comprise sets of conductive openings.

22. The unit of claim 21 wherein the means for inserting circuit altering devices between selected ones of said third and fourth sets of adapter points comprise spaced apart conductive openings.

23. The unit of claim 22 wherein said first and second board means are rectangular insulating boards mounted together with an insulator sheet in a rectangular shaped base block with the first and second sets of adapter openings arranged on opposite surfaces along one edge of the base block.

24. The unit of claim 23 wherein the outside opposed surfaces of the base block contain generally opposed ones of the conductive openings and contact openings in said first and second contact point arrays of the first and second board means.

25. The unit of claim 24 wherein the circuit completing electrical adapters are stiff wires which support the third board means relative to the first and second board means and in close proximity thereto.

26. The unit of claim 25 wherein the third board means is covered by a cap member.

27. The unit of claim 25 wherein the circuit completing electrical adapters are stiff L-shaped conductors with right angled arms, one of the arms of one group being connected to the individual ones of the first set of adapter points extending above said one edge of the base block and one of the arms of a second group being connected to the individual ones of the second set of adapter points extending above said one edge of said base block, the other arm of the respective circuit completing adapter groups being connected to individual ones of the conductive openings of the third and fourth sets of adapter points on the third board means to support said third board means adjacent said one edge of the base block in a compact T-shaped arrangement.

28. The unit of claim 25 wherein the means for connecting the first contact point array is one of a set of male or female circuit connecting pins for the first set of contact points and the other of a set of male or female circuit connecting pins comprises the means for connecting the second contact point array, the contact openings in the first and second contact point arrays have modified pin connectors connected through the base block, said modified pin connectors having a male circuit connecting pin on the male connecting side and a female circuit connecting pin on the female connecting side.

29. The unit of claim 28 wherein said male circuit connecting pins are surrounded by a protective shell which slides over an extension of a portion of the wiring harness or electronic control assembly having female connectors.

30. The unit of claim 29 wherein the third board means is covered with a cap member sealed around the rectangular edges of the board.

31. The unit of claim 28 further including at least one circuit altering device connected between said third and fourth adapter points in one or more circuits having a remote sensing element leading to a wiring harness, the unit being connectable between said wiring harness and an electronic control assembly to alter the electrical characteristics of said circuits.

32. The unit of claim 31 wherein the circuit altering device is selected from a group comprising resistors, diodes, transistors, and capacitors.

33. The unit of claim 28 having at least one control circuit alteration device connected between said third and fourth adapter points, the unit being connectable between an electronic control assembly and a wiring harness in one or more circuits leading to one or more remote control devices.

34. The unit of claim 33 wherein the circuit altering device is selected from a group comprising resistors, diodes, transistors, and capacitors.

35. An interactive connector unit insertable between a wiring harness and an automotive electronic control assembly of the type which receives input from sensors of operating parameters and produces control signals in response thereto, the connector unit in operable combination comprising:

a first board element and a second board element being mountable together with an insulating means between the first and second board elements;

a plurality of opposable pin openings on each of the first and second board elements comprising a set of straight through pin supporting passages when said boards are mounted together;

modified pins insertable in the supporting passages with the boards mounted, comprising means for connection with a wiring harness extending from one of said board elements and means for connection with an automotive electronic control assembly extending from the other of said board elements;

a plurality of electrically conductive pin openings on said first board element each connected to one of an array of electrically conductive sockets on the first board element;

a plurality of electrically conductive pin openings on said second board element each connected to one of an array of electrically conductive sockets on the second board element;

a third board element mountable adjacent said first and second elements having opposed spaced apart arrays of electrically conductive sockets, one laid out to correspond with the array on the first board element and one laid out to correspond with the array on the second board element;

means for connection of the array of sockets on each of the first and second board elements with one of the arrays of sockets on the third board element wherein selected circuit altering devices may be inserted between ones of the opposed arrays of the third board element;

means for connection of the electrically conductive pin openings on one of the said first and second board elements to an automotive electronic control assembly; and, means for connection of the electrically conductive pin openings on the other of said first and second board elements with the wiring harness for said electronic control assembly.

36. An inline adapter for conveniently altering electrical characteristics of selected ones of a plurality of circuits each defined by one of a bundle of wires having a disconnectable pin and socket wiring harness having a pin side and a corresponding socket side for each wire, the inline adapter comprising:

a first insulating means having a first surface and a spaced apart second surface;

a plurality of generally opposed contact points on each of said first and second surfaces, each plurality of contact points on each surface comprising a first set and a second set of contact point openings arranged in an array;

an array of adapter points on the first surface of the first insulating means and a corresponding array of adapter points on the second surface of the first insulating means;

a plurality of traces connecting the array of adapter points on the first surface of the first insulating means with the first set of contact points on said surface and a plurality of traces connecting the array of adapter points on the second surface of the first insulating means with the first set of contact points on said surface;

male connecting means for individually connecting the first set of contact points on the first surface of the insulating means with the socket side of a wiring harness;

female connecting means for individually connecting the first set of contact points on the second surface of the insulating means with the pin side of the wiring harness;

modified connecting means for the second sets of contact point openings, extending through the first insulating means, said means having a male connecting means extending from one surface and a female connecting means extending from the other surface, the male connecting portion and the female connecting portion being conformed respectively, to connect with the socket side and with the pin side of a wiring harness along with the male and female connecting means of the first set of contact points, so that the opposite halves of the wiring harness will be engageable with the male and female connecting means on the first insulating means;

a second insulating means having spaced apart first and second arrays of adapter points, each corresponding to one of the adapter point arrays on the tint or second surfaces of the first insulating means;

connecting pins between the array of adapter points on the first surface of the first insulating means and one of the spaced apart arrays of adapter points on the second insulating means; and, connecting pins between the array of adapter points on the second surface of the first insulating means and the other of the spaced apart arrays of adapter points on the second insulating means, wherein circuit altering devices may be selectively installed between individual adapter points on the second insulating means to alter a circuit when the inline adapter is connected to the wiring harness at the first and second surface of the first insulating means by means of the connecting means, whereby the modified connecting means defines a direct connection in selected circuits.

*37. In an interactive ignition modifier adapted for insertion between the terminal unit of a wiring harness and the terminal unit of an automotive electronic control assembly of the type which receives inputs from sensors of operating parameters and produces control signals in response thereto via conductors in said wiring harness, each of said terminal units having cooperative connecting terminals, the combination comprising:*

*(a) a first connection unit having a plurality of connecting terminals conforming to corresponding connecting terminals of the wiring harness terminal unit;*

*(b) a second connection unit having a plurality of connecting terminals conforming to corresponding connecting terminals of the control assembly terminal unit;*

*(c) a control module having a plurality of primary and secondary adapter points arranged in sets having a primary adapter point and a secondary adapter point;*

*(d) first means for electrically connecting a first portion of the connecting terminals of said first connection unit to corresponding primary adapter points of said sets of adapter points;*

*(e) second means for electrically connecting a first portion of the connecting terminals of said second connection unit to corresponding secondary adapter points of said sets of adapter points;*

*(f) means for selectively inserting circuit altering means between primary and secondary adapter points of said sets of adapter points; and*

(g) electrical connector means independent of said control module for electrically connecting a second portion of connecting terminals of said first connection unit directly to a second portion of connecting terminals of said second connection unit.

*38. The combination of claim 37, wherein at least one-half of the connecting terminals in said connection units are connected by said independent electrical connector means.*

*39. The combination of claim 37, wherein said first connection unit comprises a circuit board, and said first means for electrically connecting comprises a plurality of contact points on said circuit board electrically connected to a plurality of connecting terminals of said first connection unit, a plurality of first unit adapter points on said circuit board electrically connected to at least some of said contact points, and electrical conductors interconnecting said first unit adapter points to said primary adapter points.*

*40. The combination of claim 39, where in said direct connecting means comprises a plurality of contact openings in said circuit board connected to said second portion of the connecting terminals of said first terminal unit and separate electrical conductors extending from said contact openings to make electrical contact with said another portion of the connecting terminals of said second terminal unit.*

*41. The combination of claim 40, wherein said contact openings are at least as great in number as said contact points.*

*42. The combination of claim 39, wherein said second connection unit comprises a second circuit board, and said second means for electrically connecting comprises a plurality of contact points on said second circuit board electrically connected to a plurality of connecting terminals of said second connection unit, a plurality of second unit adapter points on said second circuit board electrically connected to at least some of said contact points on said second board, and electrical conductors interconnecting said second unit adapter points to said secondary adapter points.*

*43. The combination of claim 42, wherein said direct connecting means comprises a plurality of first unit contact openings in said first recited circuit board connected to said second portion of the connecting terminals of said first connection unit, a plurality of second unit contact openings*

*in said second circuit board connected to said second portion of the connecting terminal of said second connection unit and electrical conductors extending from said first unit contact openings to said second unit contact openings.*

*44. The combination of claim 43, wherein said first and second circuit boards are spaced from each other in a conforming relationship in which said first unit contact openings are aligned with corresponding second unit contact opening and at least a portion of said electrical conductor extend between said contact openings in said first and second units to rigidly support said first and second circuit board in said spaced conforming relationship.*

*45. In an interactive ignition modifier adapted for inserting between the terminal unit of a wiring harness and the terminal unit of an automotive electronic control assembly of the type which receives inputs from sensors of operating parameters and produces control signals in response thereto via conductors in said wiring harness, each of said terminal units having cooperative connecting terminals, the combination comprising;*

*(a) a first connection unit having a plurality of connecting terminals conforming to corresponding connecting terminals of the wiring harness terminal unit;*

*(b) a circuit board in said first connection unit comprising a plurality of contact points on said circuit board electrically connected to a first set of connecting terminals of said first connection unit, a plurality of contact openings in said circuit board connected to said another set of the connecting terminals of said first terminal unit, and a plurality of first unit adapter points on said circuit board electrically connected to at least some of said contact points,*

*(c) a second connection unit having a plurality of connecting terminals conforming to corresponding connecting terminals of the control assembly terminal unit;*

*(d) a control module having a plurality of primary and secondary adaptor points arranged in sets having a primary adapter point and a secondary adapter point;*

*(e) first means for electrically interconnecting said first unit adaptor points on said circuit board to corresponding primary adapter points of said sets of adapter points in said control module;*

*(f) second means for electrically connecting a first portion of the connector terminals of said second connection unit to corresponding secondary adapter points of said sets of adapter points;*

(g) means for selectively inserting circuit altering means between primary and secondary adapter points of said of adapter points; and (h) a plurality of electrical connectors connected to and extending from a plurality of said contact openings into electrical contact with a second portion of terminals of said second connecting unit.

*46. In an interactive ignition modifier adapted for insertion between the terminal unit of a wiring harness and the terminal unit of an automotive electronic control assembly of the type which receives inputs from sensors of operating parameters and produces control signals in response thereto via conductors in said wiring harness, each of said terminal units having cooperative connecting terminals, the combination comprising:*

*(a) a first connection unit having a plurality of connecting terminals conforming to corresponding connecting terminals of the wiring harness terminal unit;*

*(b) a circuit board in said first connection unit comprising a plurality of contact points on said circuit board electrically connected to a first set of connecting terminals of said first connection unit and a plurality of contact openings in said circuit board connected to said another set of the connecting terminals of said first terminal unit;*

*(c) a second connection unit having a plurality of connecting terminals conforming to corresponding connecting terminals of the control assembly terminal unit;*

(i d) *a second circuit board in said second connection unit comprising a plurality of contact points on said circuit board electrically connected to a first set of connecting terminals of said second connection unit and a plurality of contact openings in said second circuit board connected to said another set of the connecting terminals of said second terminal unit;*

*(e) a control module having a plurality of primary and secondary adaptor points arranged in sets having a primary adapter point and a secondary adapter point;*

*(f) first means for electrically interconnecting said a plurality of the contact points in said first circuit board to corresponding primary adapter points of said sets of adapter points in said control module;*

(g) second means for electrically connecting a plurality of the contact points in said second circuit board to corresponding secondary adapter points of said sets of adapter points;

*(h) means for electively inserting circuit altering means between primary and secondary adapter points of said sets of adapter points;*

*(i) a plurality of electrical connectors connected to a plurality of said contact openings in said first circuit board and extending to said circuit board and contacted to a plurality of contact openings in said second circuit board.*

*47. In a control system for the engine of an automotive vehicle, the combination comprising:*

*(a) an electronic control assembly for said engine comprising means for generating engine control signals in response to signals representative of operating parameters applied to said electronic control assembly;*

*(b) a wiring harness having a plurality of electrical conductors adapted to convey electrical signals between said electronic control assembly and end point devices in said automotive vehicle;*

*(c) a first terminal unit for said wiring harness incorporating a plurality of connecting terminals;*

*(d) a second terminal unit for said electronic control assembly incorporating a plurality of connecting terminals;*

*(e) a control module having a plurality of primary and secondary adaptor points arranged in sets having a primary adapter point and a secondary adapter point;*

*(f) first means for electrically connecting a portion of the connecting terminals of said first wiring harness terminal unit to corresponding primary adapter points of said sets of adapter points;*

*(g) second means for electrically connecting a portion of the connecting terminals of said second connection unit to corresponding secondary adapter points of said sets of adapter points;*

*(h) means for selectively inserting circuit altering means between primary and secondary adapter points of said sets of adapter points; and*

*(i) means for directly connecting another portion of the connecting terminals of said first terminal unit directly*

*to another portion of the connecting terminals of said second terminal unit.*

*48. The control system of claim 47, wherein said first means for electrically connecting comprises a first connection unit having a first plurality of connecting terminals conforming to corresponding connecting terminals for said first terminal unit and in contact with primary adaptor points of said sets of adapter points, said second means for electrically connecting comprises a second connection unit having a first plurality of connecting terminals conforming to and in contact with the corresponding connecting terminals of said second terminal unit for said electronic control assembly and in contact with the secondary adapter points of said sets of adapter points; and said means for directly connecting comprises a second plurality connecting terminals in each of said first and second connection unit which are connected to each other through conductors remote from said control module.*

*49. The control systems of claim 48, wherein said second plurality of connecting terminals are at least as great as said first plurality of connecting terminals for said first and second connecting units.*

*50. The control system of claim 47 further comprising a connection unit connected to said first terminal unit and having terminals connected to the terminals of said first terminal unit, said connection unit having a circuit board, and said first means for electrically connecting comprises a plurality of contact points on said circuit board electrically connected to a plurality of terminals of said connection unit, a plurality of first unit adapter points on said circuit board electrically connected to at least some of said contact points, and electrical conductors interconnecting said first unit adapter points to said primary adapter points.*

*51. The combination of claim 50, wherein said direct connecting means comprises a plurality of contact openings in said circuit board connected to said portion of the connecting terminals of said first terminal unit and separate electrical conductors extending from said contact openings to make electrical contact with said another portion of the connecting terminals of said second terminal unit.*

*52. In a method for varying the operation of an automotive vehicle having an electronic control assembly of the type which receives input signals from end point sensors which monitor operating parameters of said vehicle and in response to said input signals produces output control signals to end point control units in said vehicle via a plurality of wires which extend between said end point devices and said control assembly in a wiring harness connected to said control assembly, the steps comprising:*

*(a) disassembling said wiring harness from said electronic control assembly to expose cooperative connecting terminals in the ends of said wires and in said control assembly though which signals are applied to and transmitted from said control assembly;*

*(b) providing a control module having a plurality of primary and secondary adapter points arranged in sets having a primary adapter point and a secondary adapter point and incorporating circuit altering means between said primary and secondary adapter points of said sets of adapter points;*

*(c) transmitting a first set of selected signals between selected ones of said en point devices and the terminal of said control assembly between the terminal ends of said wires and the corresponding terminals of said electronic control assembly via said control module and said circuit altering means to change the value of the selected signals transmitted between said end point devices and said electronic control assembly; and*

*(d) transmitting a second set of signals between said end point devices and said electronic control module between the terminals of said wires and said electronic control assembly through conductive paths which are separate from said control module.*

*53. The method of claim 52, wherein at least one-half of said signals are transmitted through said conductive paths in accordance with step (d).*

* * * * *